United States Patent
Emery et al.

(10) Patent No.: US 12,461,518 B2
(45) Date of Patent: Nov. 4, 2025

(54) SYSTEMS AND METHODS FOR PREDICTIVE MAINTENANCE USING ONBOARD ANALYTICS

(71) Applicant: Honeywell International Inc., Charlotte, NC (US)

(72) Inventors: Matthew Emery, Charlotte, NC (US); Mitchell O'Brien, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 588 days.

(21) Appl. No.: 17/847,756

(22) Filed: Jun. 23, 2022

(65) Prior Publication Data
US 2023/0418280 A1 Dec. 28, 2023

(51) Int. Cl.
G05B 23/02 (2006.01)

(52) U.S. Cl.
CPC ....... *G05B 23/0283* (2013.01); *G05B 23/024* (2013.01); *G05B 23/0264* (2013.01); *G05B 23/027* (2013.01)

(58) Field of Classification Search
CPC .............. G05B 23/0283; G05B 23/024; G05B 23/0264; G05B 23/027
See application file for complete search history.

(56) References Cited

U.S. PATENT DOCUMENTS

| | | | |
|---|---|---|---|
| 2016/0093119 A1* | 3/2016 | Ahn | G07C 5/006 701/29.3 |
| 2018/0197351 A1* | 7/2018 | Dong | G05B 23/0254 |
| 2019/0147670 A1* | 5/2019 | Chopra | G07C 5/0808 701/29.1 |
| 2020/0106481 A1* | 4/2020 | Mitchell | H04B 3/56 |
| 2020/0172050 A1* | 6/2020 | Schwarz | B60R 25/33 |

* cited by examiner

*Primary Examiner* — Lee E Rodak
*Assistant Examiner* — Byung Ro Lee
(74) *Attorney, Agent, or Firm* — ALSTON & BIRD LLP

(57) ABSTRACT

A method of an onboard device may include receiving component data related to a component of the vehicle during an operation of the vehicle; determining that the component data satisfies a first threshold during the operation of the vehicle; generating a condition indicator that indicates that the component data satisfies the first threshold, based on determining that the component data satisfies the first threshold during the operation of the vehicle; and transmitting the condition indicator to a remote server via a network during the operation of the vehicle. The remote server may determine whether a number of condition indicators, including the condition indicator, received from the onboard device of the vehicle satisfies a second threshold, and selectively generate an alert associated with the component of the vehicle based on determining whether the number of condition indicators received.

20 Claims, 18 Drawing Sheets

RULE 2:

RULE 3:

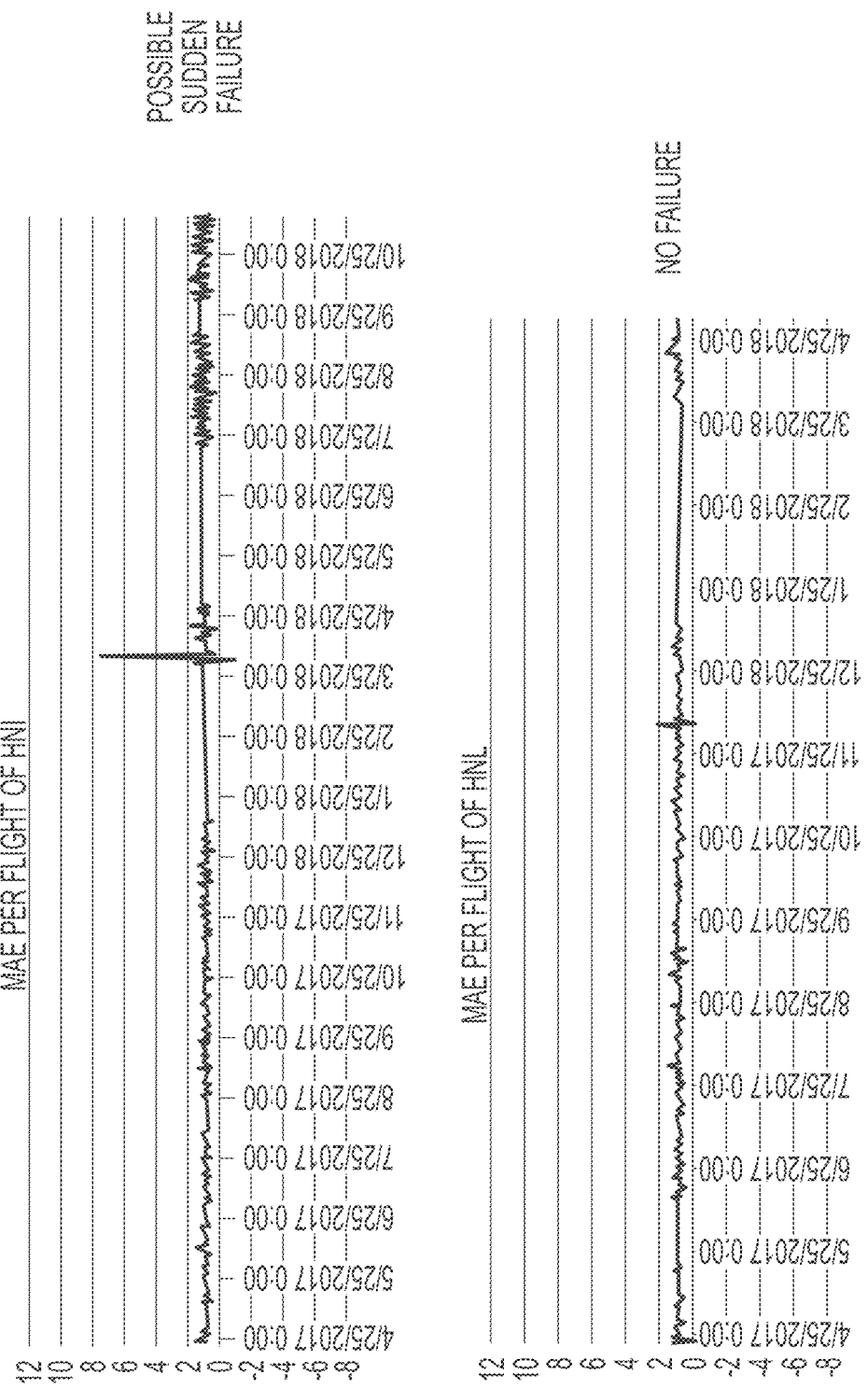
FIG. 11 (CONT. 2)

SYSTEMS AND METHODS FOR PREDICTIVE MAINTENANCE USING ONBOARD ANALYTICS

TECHNICAL FIELD

The present disclosure relates to systems and methods for predictive maintenance using onboard analytics. More specifically, the present disclosure relates to an onboard device that performs first analytics using component data of a vehicle, generates a condition indicator based on the first analytics, and transmits the condition indicator to a remote server during operation of the vehicle. Moreover, the present disclosure relates to a remote server that receives the condition indicator from the onboard device, and performs second analytics using the condition indicator.

BACKGROUND

An aircraft includes many disparate systems, such as a flight control system, a landing gear system, a hydraulic system, an electrical system, an engine system, an avionics system, an environmental control system, a fuel system, a propulsion system, etc. These systems respectively include many underlying components, such as valves, pumps, reservoirs, oil coolers, actuators, generators, turbines, etc.

During operation of the aircraft, sensors monitor the components, and generate vast amounts of component data associated with the components. Typically, this vast amount of data is stored by storage devices of the vehicle, and is offloaded after the conclusion of the operation of the aircraft. A system can then analyze the offloaded data to determine if the components are operating appropriately.

From a safety standpoint, the various systems of the aircraft might require real-time monitoring and fault detection. However, the onboard computation systems might be incapable of processing the vast amount of data due to a lack of computational resources. Moreover, the onboard computation systems might be incapable of transmitting the vast amount of data to a remote server based on communication link bandwidth constraints.

Accordingly, there is a need for a technique that permits real-time monitoring of component data in a manner that conserves computational resources of an onboard device of a vehicle, and that conserves bandwidth of a vehicle-to-ground communication link.

SUMMARY

Embodiments of the present disclosure relate to, among other things, systems and methods for performing predictive maintenance using onboard analytics. Each of the embodiments disclosed herein may include one or more of the features described in connection with any of the other disclosed embodiments.

According to an example embodiment, a method may include receiving, by an onboard device of a vehicle, component data related to a component of the vehicle during an operation of the vehicle; determining, by the onboard device of the vehicle, that the component data satisfies a first threshold during the operation of the vehicle; generating, by the onboard device of the vehicle, a condition indicator that indicates that the component data satisfies the first threshold, based on determining that the component data satisfies the first threshold during the operation of the vehicle; and transmitting, by the onboard device of the vehicle, the condition indicator to a remote server via a network during the operation of the vehicle. The remote server may be configured to determine whether a number of condition indicators, including the condition indicator, received from the onboard device of the vehicle satisfies a second threshold, and selectively generate an alert associated with the component of the vehicle based on determining whether the number of condition indicators received from the onboard device of the vehicle satisfies the second threshold.

According to an example embodiment, an onboard device of a vehicle may include a memory configured to store instructions; and a processor configured to execute the instructions to perform a method comprising: receiving component data related to a component of the vehicle during an operation of the vehicle; determining that the component data satisfies a first threshold during the operation of the vehicle; generating a condition indicator that indicates that the component data satisfies the first threshold, based on determining that the component data satisfies the first threshold during the operation of the vehicle; and transmitting the condition indicator to a remote server via a network during the operation of the vehicle. The remote server may be configured to determine whether a number of condition indicators, including the condition indicator, received from the onboard device of the vehicle satisfies a second threshold, and selectively generate an alert associated with the component of the vehicle based on determining whether the number of condition indicators received According to an example embodiment, a non-transitory computer-readable medium may store instructions that, when executed by a processor of an onboard device, cause the processor to perform a method comprising: receiving component data related to a component of the vehicle during an operation of the vehicle; determining that the component data satisfies a first threshold during the operation of the vehicle; generating a condition indicator that indicates that the component data satisfies the first threshold, based on determining that the component data satisfies the first threshold during the operation of the vehicle; and transmitting the condition indicator to a remote server via a network during the operation of the vehicle. The remote server may be configured to determine whether a number of condition indicators, including the condition indicator, received from the onboard device of the vehicle satisfies a second threshold, and selectively generate an alert associated with the component of the vehicle based on determining whether the number of condition indicators received It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

As described above, there is a need for a technique that permits real-time monitoring of component data in a manner that conserves computational resources of an onboard device of a vehicle, and that conserves bandwidth of a vehicle-to-ground communication link.

Example embodiments of the present disclosure provide an onboard device of a vehicle that receives component data related to a component of the vehicle during operation of the vehicle, determines that the component data satisfies a first threshold during operation of the vehicle, generates a condition indicator that indicates that the component data satisfies the first threshold, and transmits the condition indicator to a remote server during the operation of the vehicle.

In this way, the onboard device of the vehicle permits real-time monitoring and fault detection of components in a manner that conserves computational resources of the onboard device. For instance, the onboard device compares the component data to a first threshold, and generates the condition indicator based on the component data satisfying the first threshold. In this way, the onboard device can perform real-time fault monitoring without being required to perform computationally intensive or expensive analytics. Moreover, the condition indicator constitutes less data than as compared to the component data of the vehicle. In this way, the transmission of the condition indicator to the remote server does not consume an exorbitant amount of bandwidth of a vehicle-to-ground communication link.

Moreover, example embodiments of the present disclosure provide a remote server that determines whether a number of condition indicators received from the onboard device of the vehicle satisfies a second threshold, and selectively generates an alert associated with the component of the vehicle based on determining whether the number of condition indicators received from the onboard device of the vehicle satisfies the second threshold. In this way, the remote server permits real-time monitoring and fault detection of components of a vehicle, and predictive maintenance using onboard analytics.

Accordingly, some example embodiments of the present disclosure constitute a technical improvement in the utilization of computational and network resources associated with vehicle component monitoring, and constitute an improvement in the technical field of vehicle component monitoring.

Figure 1:
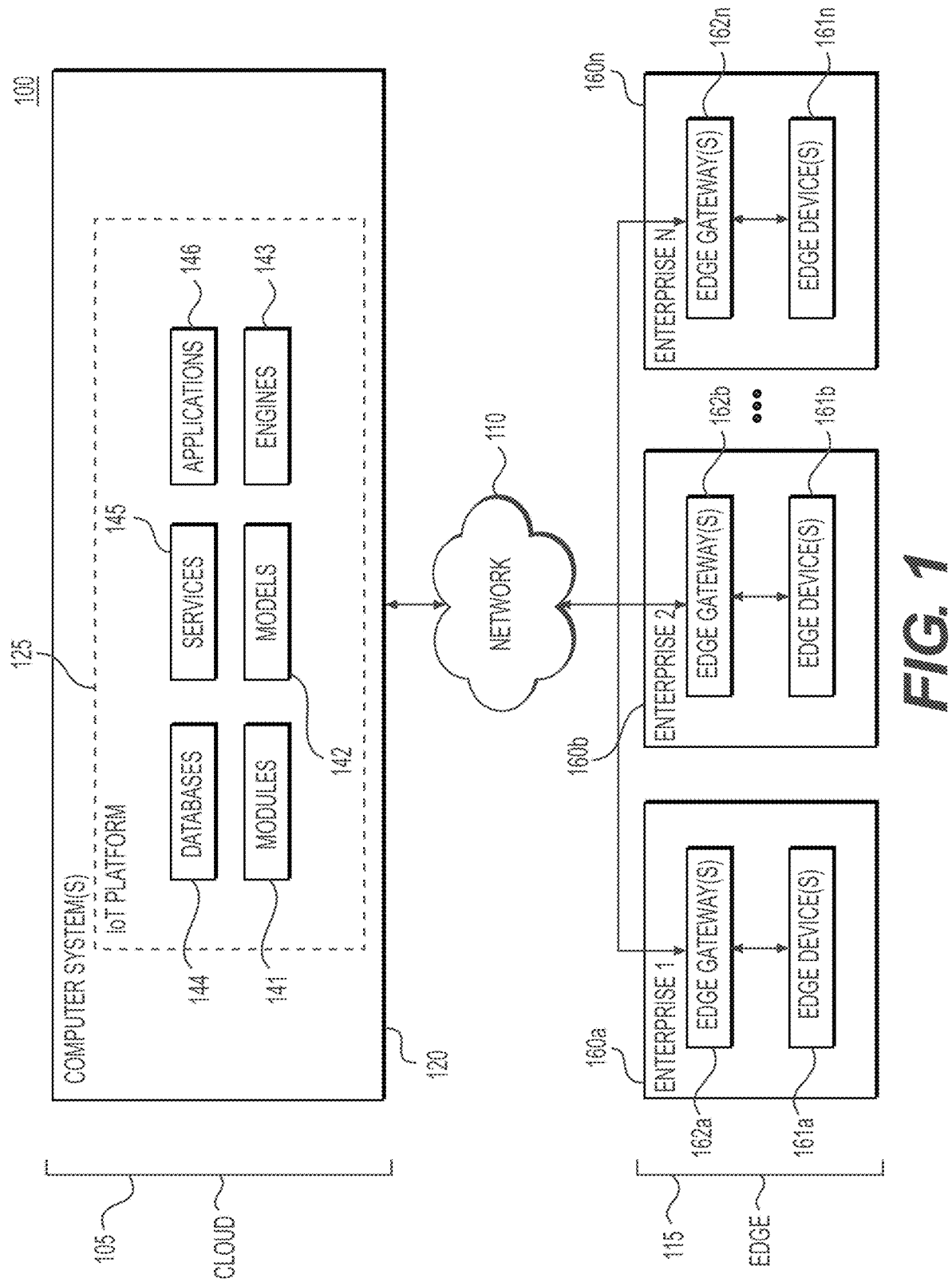

FIG. 1 depicts an exemplary networked computing system environment, according to one or more embodiments.

Figure 2:
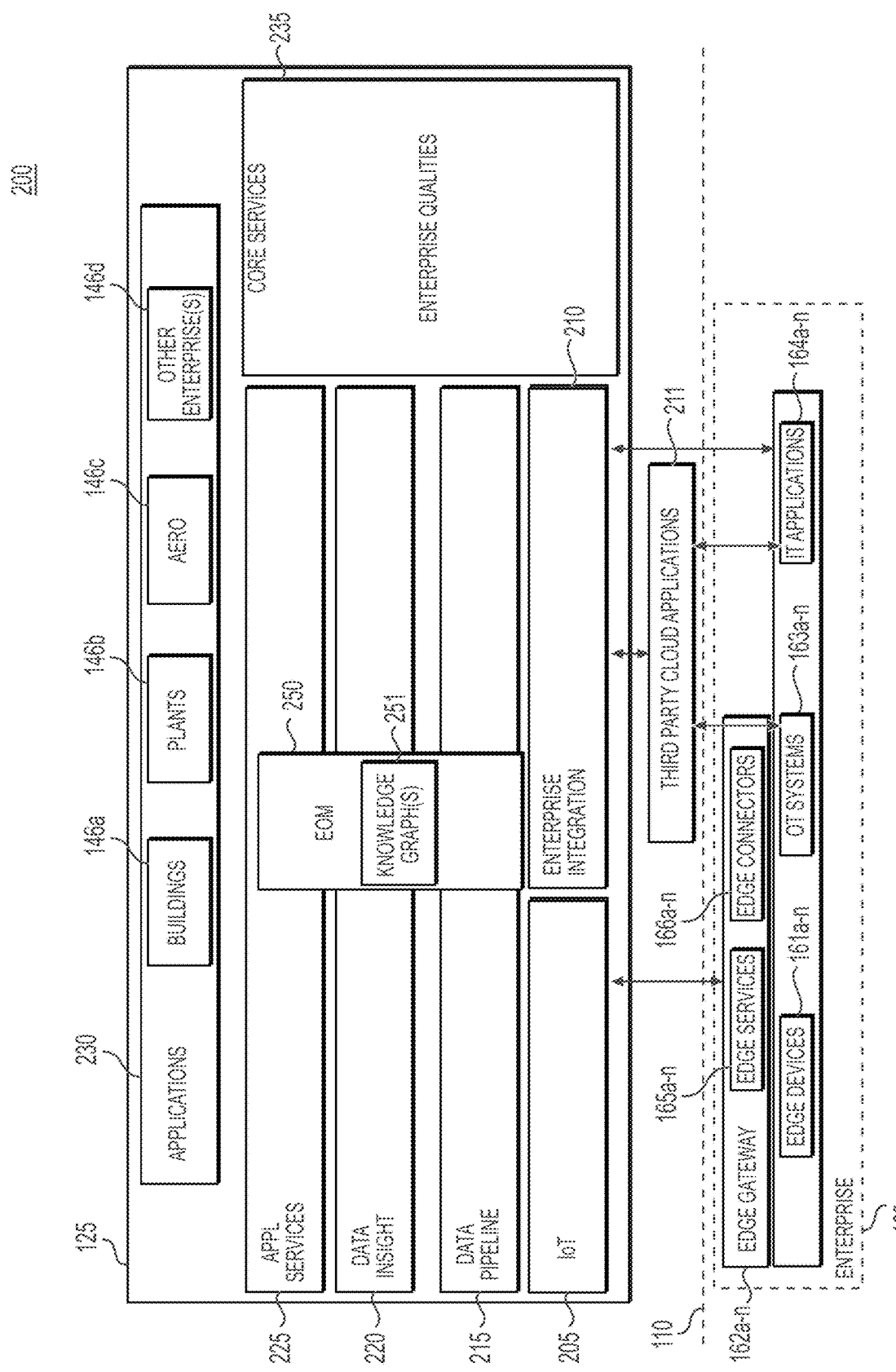

FIG. 2 depicts a schematic block diagram of a framework of an IoT platform of the networked computing system environment of FIG. 1.

Figure 3:
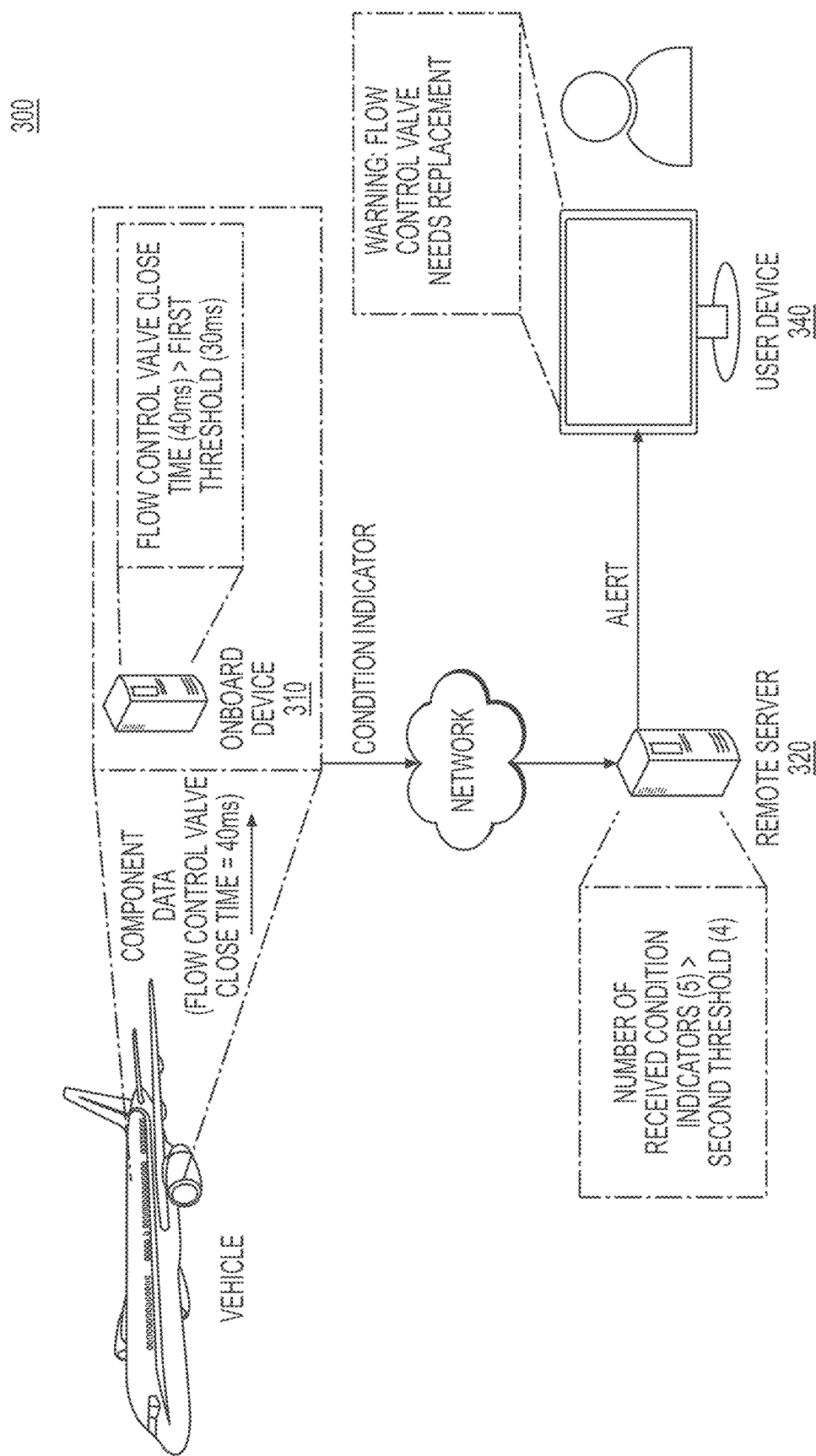

FIG. 3 depicts an example overview of a system for performing predictive maintenance using onboard analytics.

Figure 4:
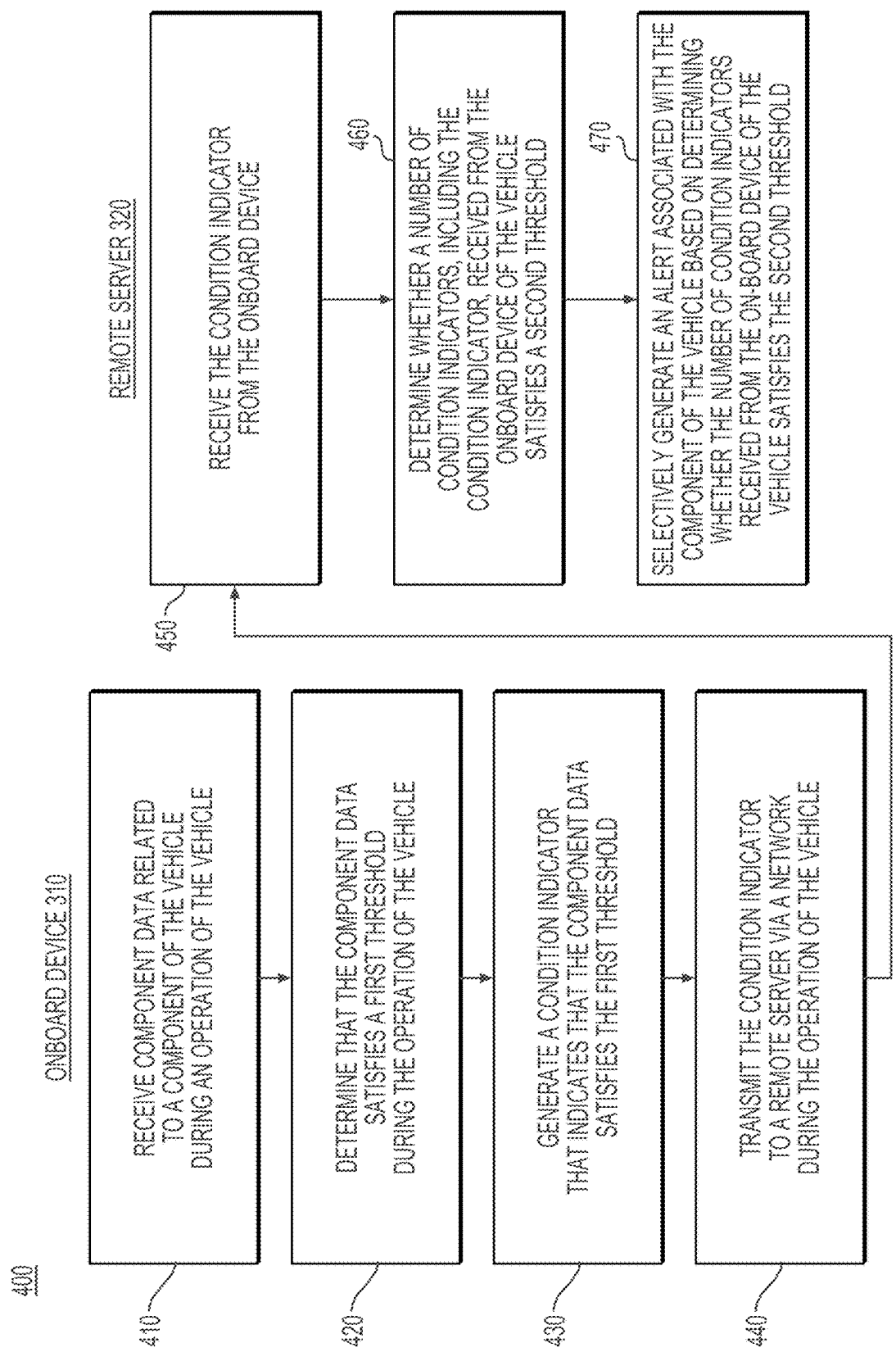

FIG. 4 depicts a flowchart of an example process for performing predictive maintenance using onboard analytics.

Figure 5:
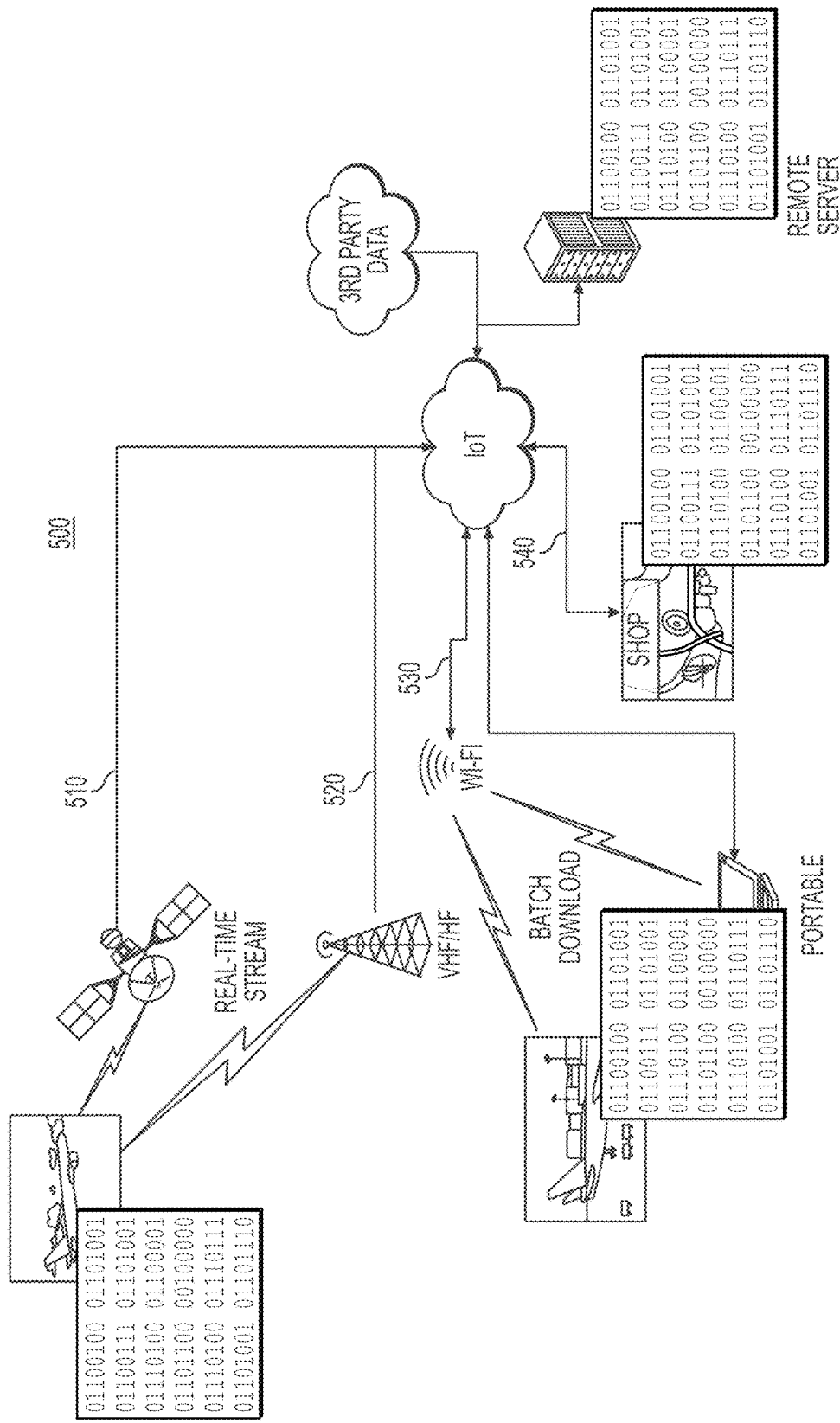

FIG. 5 depicts a diagram of an example data scope for analytics, according to one or more embodiments.

Figure 6:
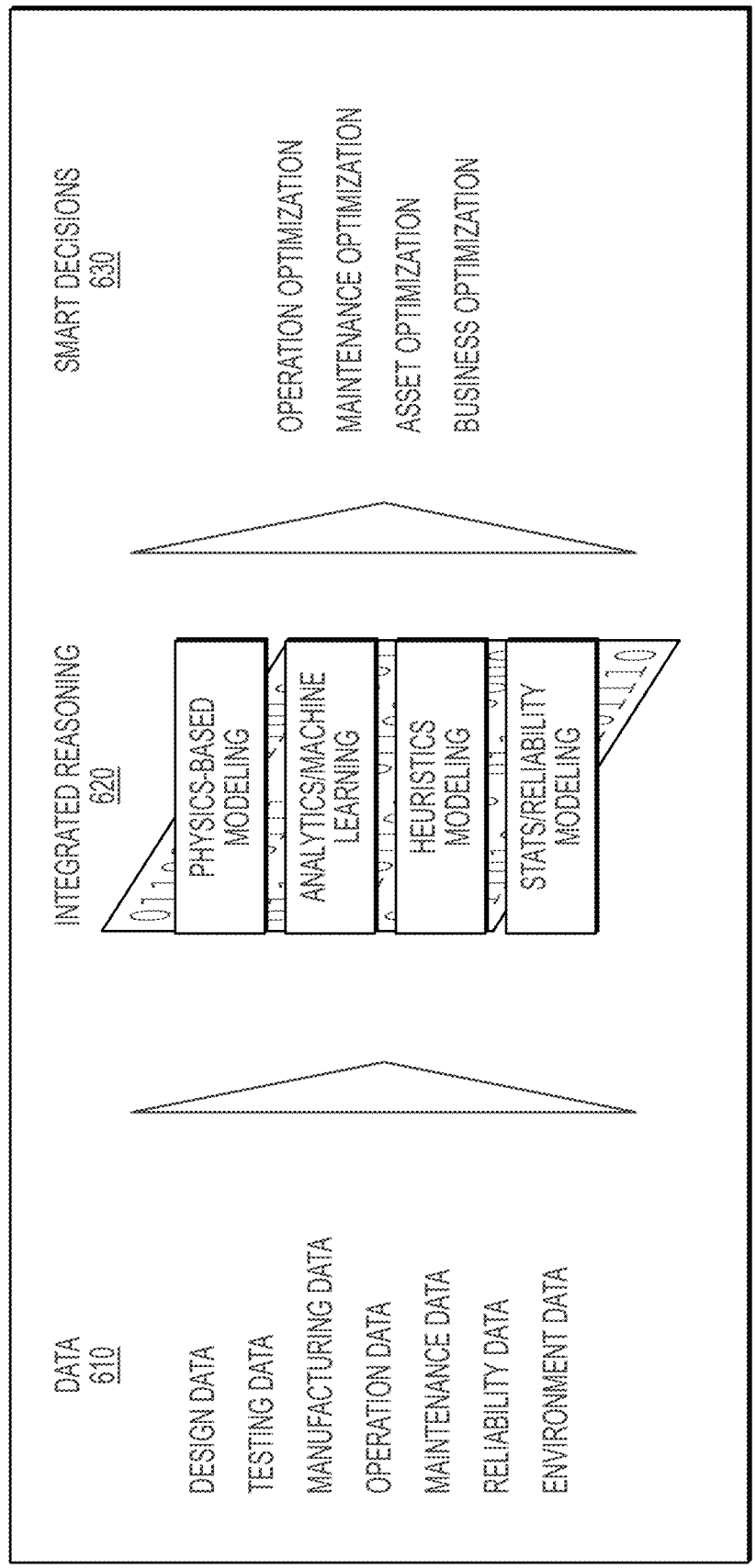

FIG. 6 depicts a diagram of analytics transfer to smart decisions, according to one or more embodiments.

Figure 7:
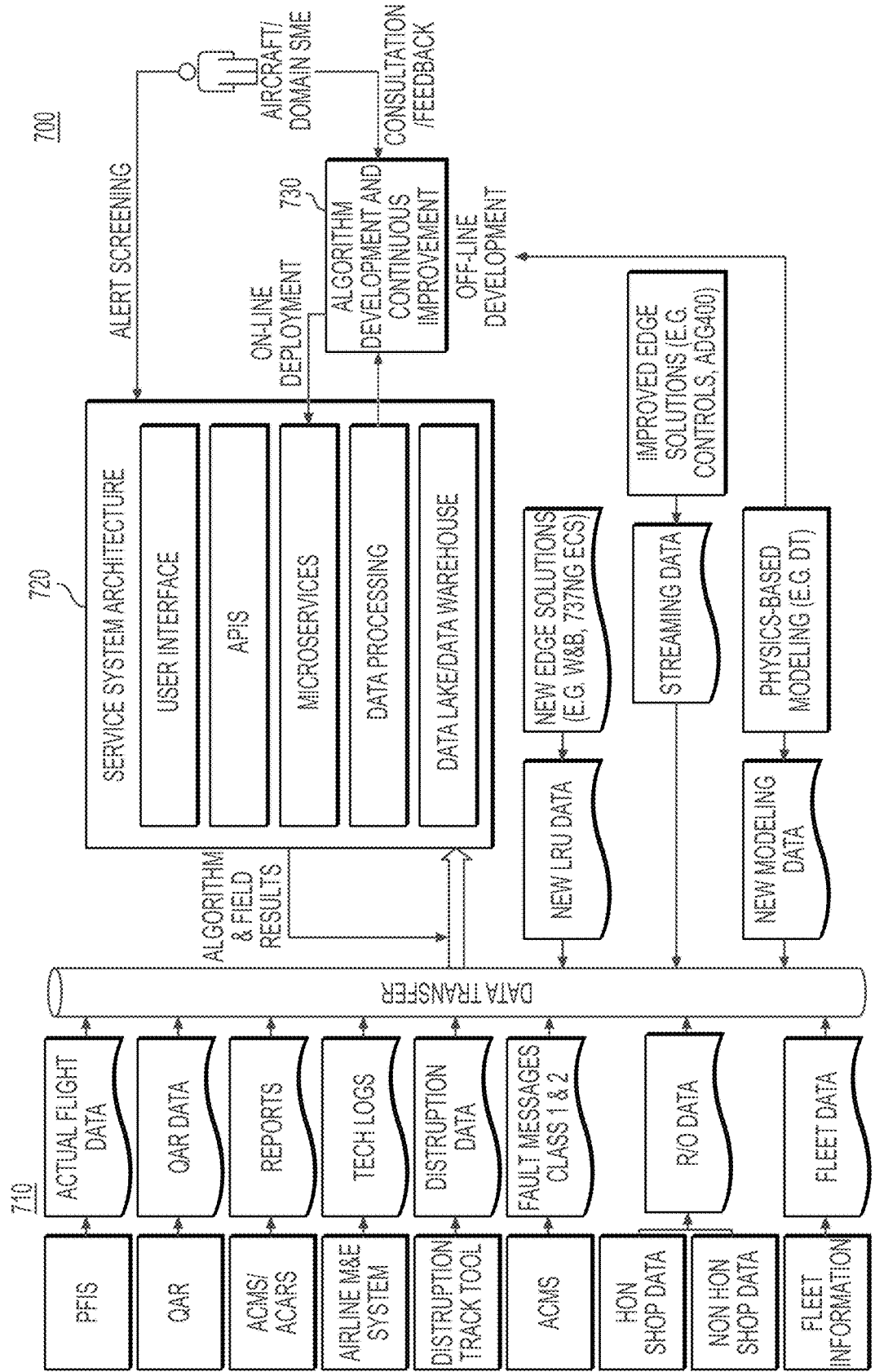

FIG. 7 depicts a diagram of analytics for connected maintenance in a connected system framework.

Figure 8:
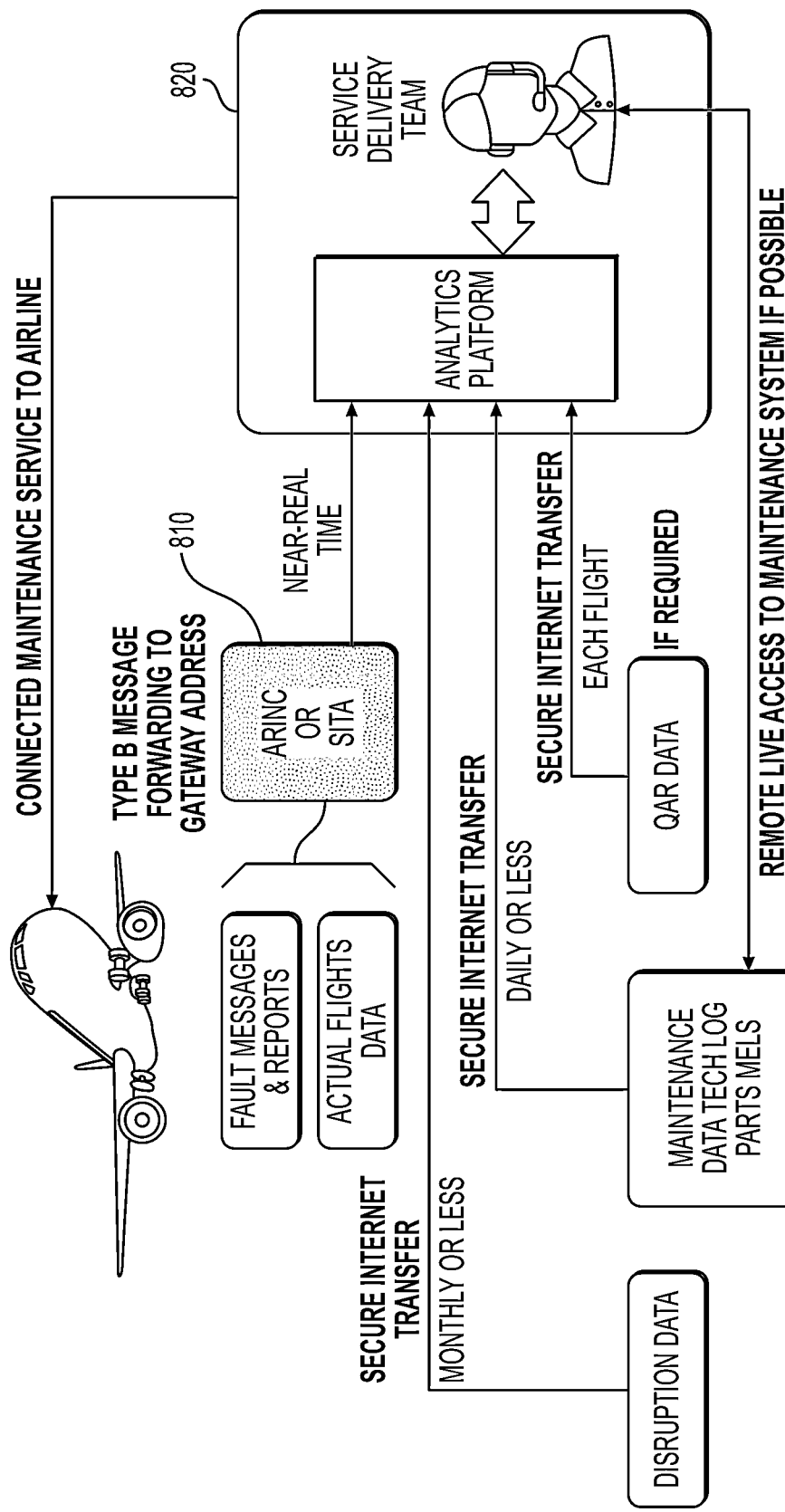

FIG. 8 depicts a diagram of an analytics-centered data view in a connected maintenance framework.

Figure 9:
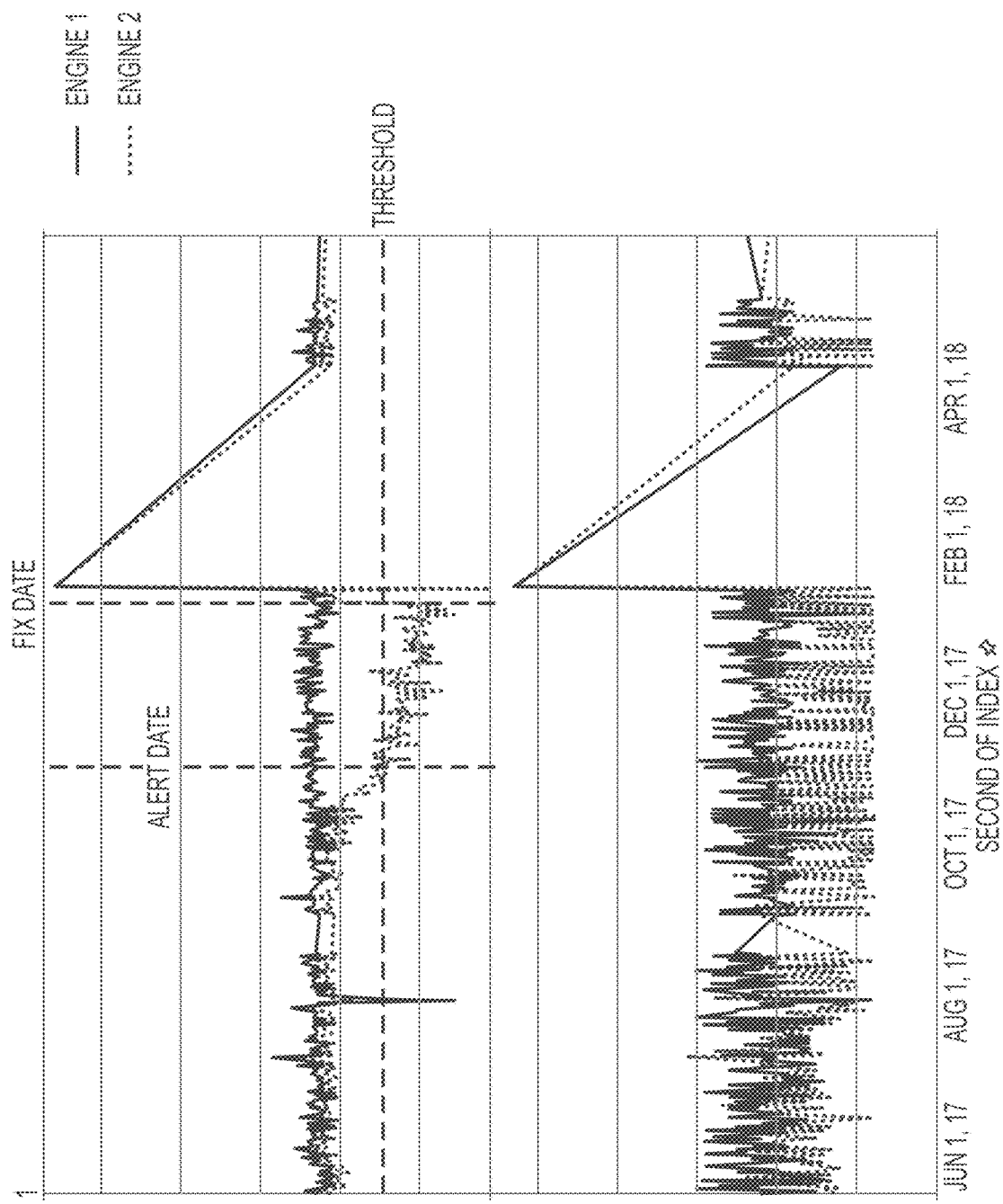

FIG. 9 depicts a diagram of analytics models.

Figure 10:
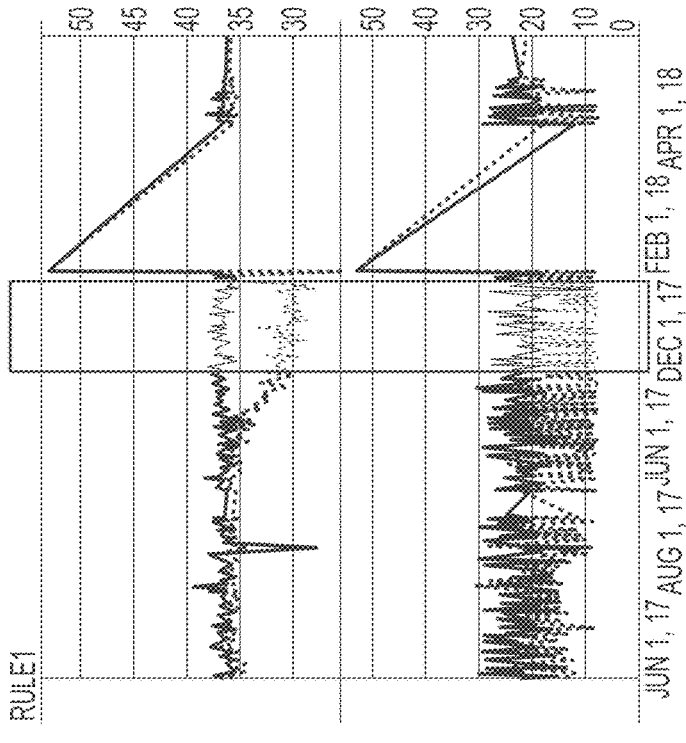
Figure 10:
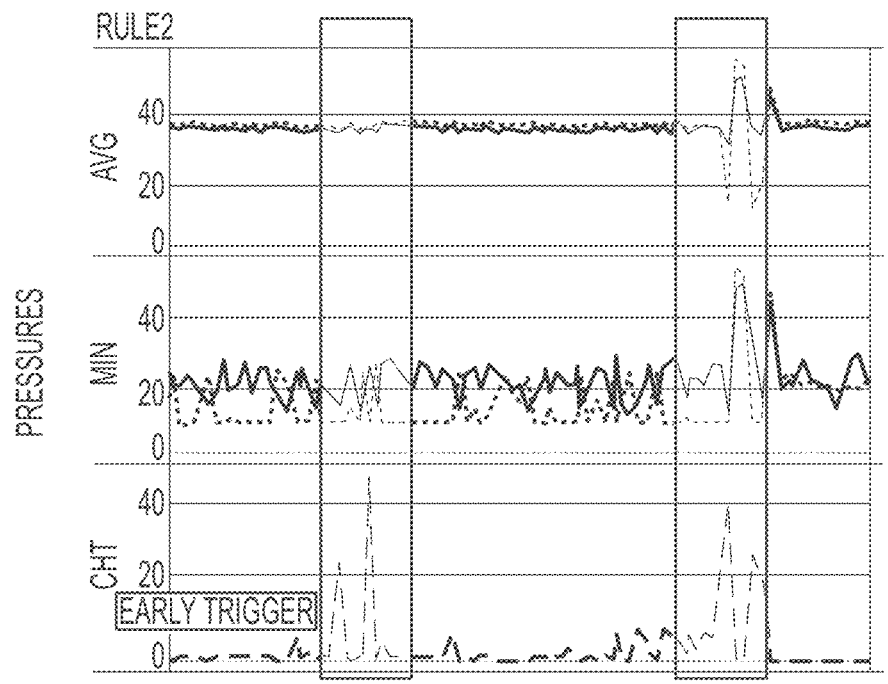
Figure 10:
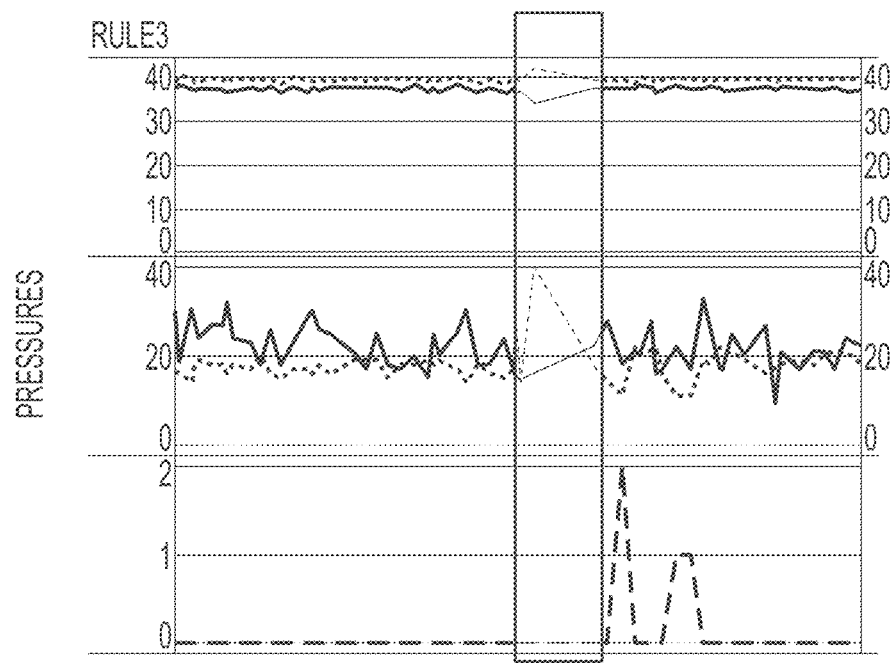

FIG. 10 depicts a diagram of clustering for rule-based prediction.

Figure 11:
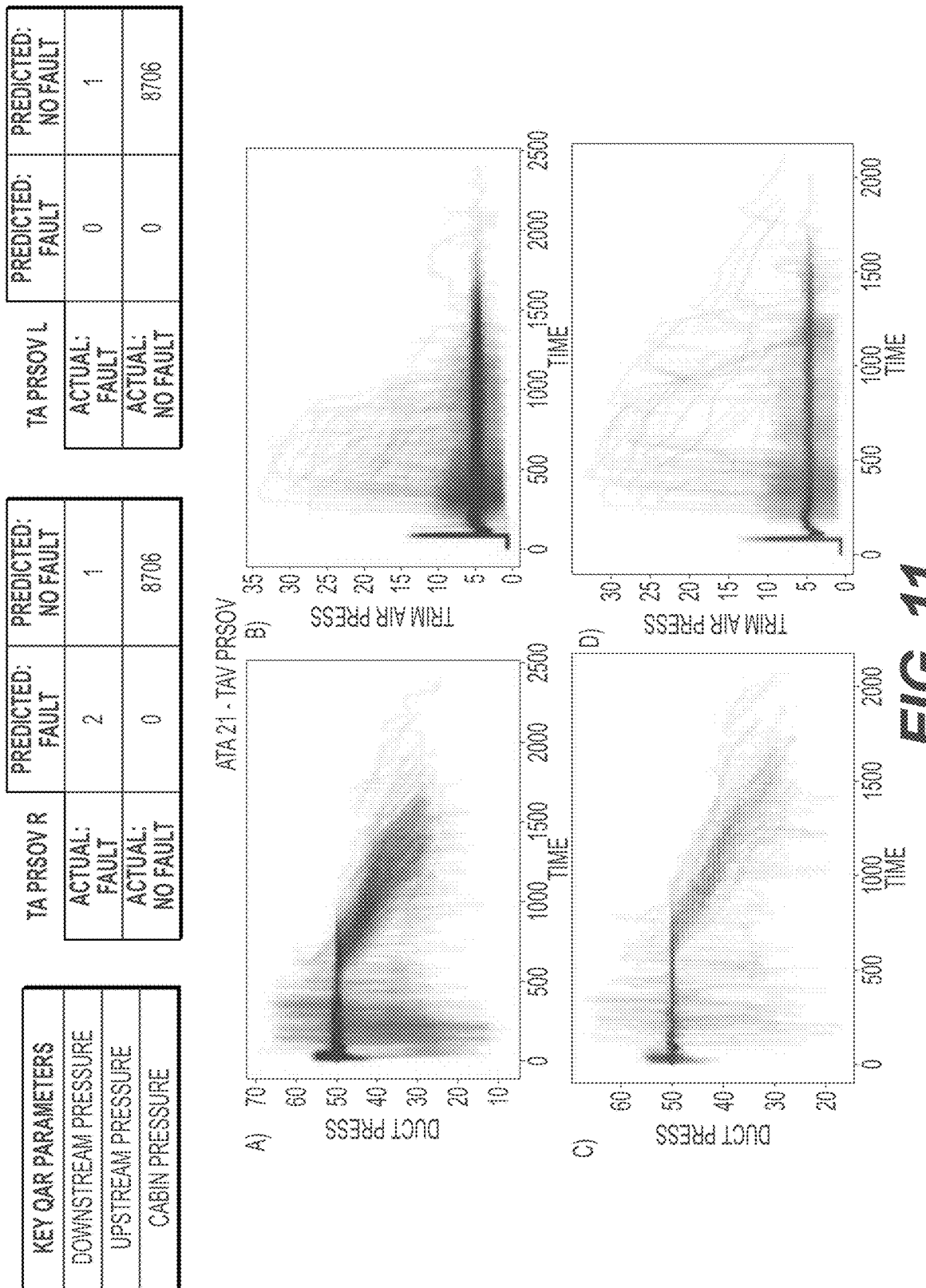
Figure 11:
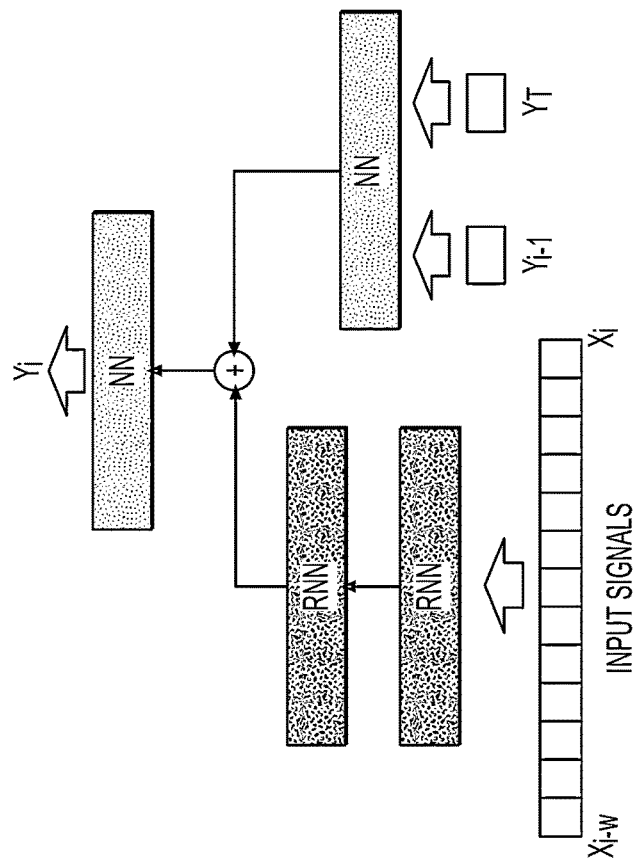
Figure 11:
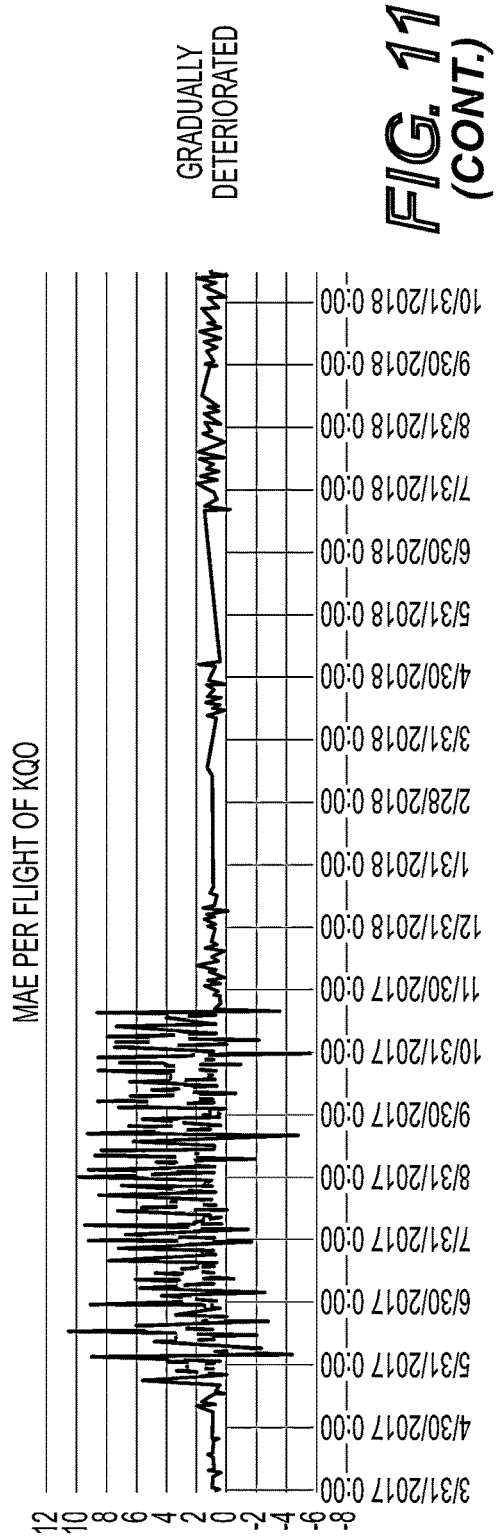

FIG. 11 depicts a diagram for deep learning with neural a network for prediction.

Figure 12:
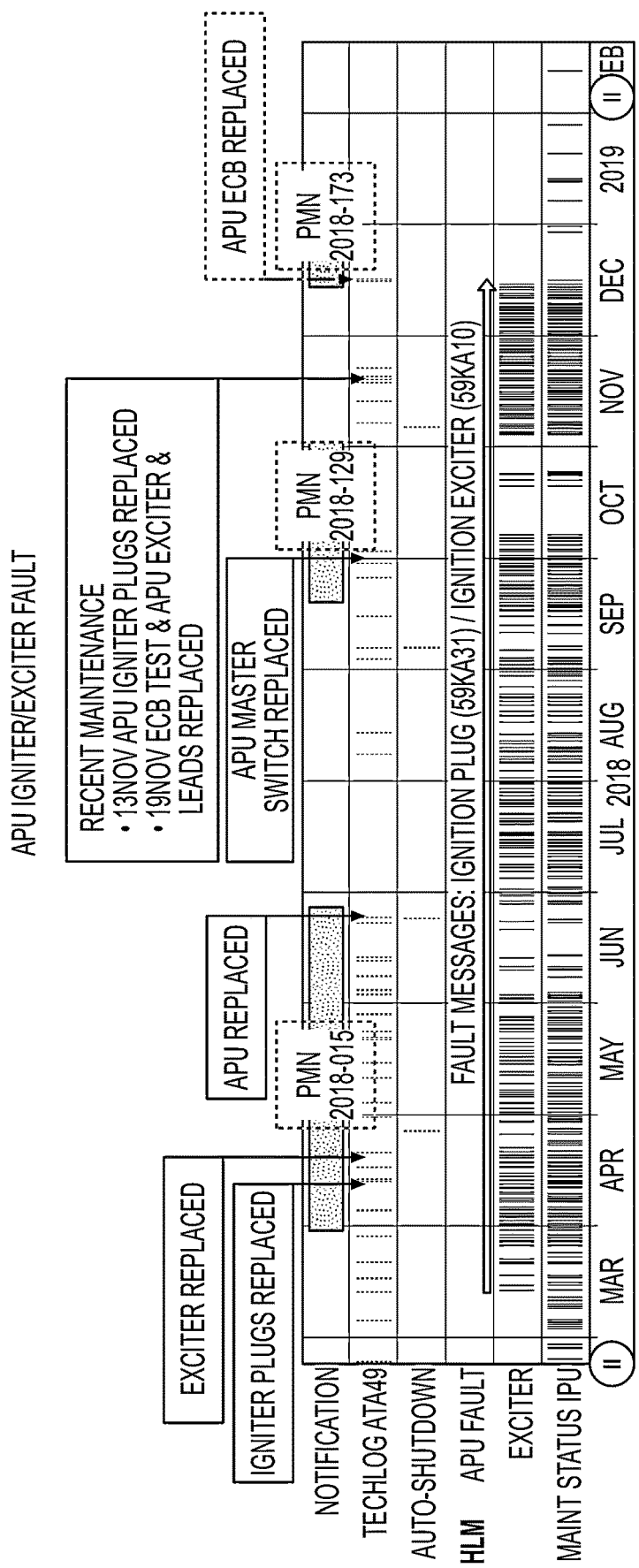

FIG. 12 depicts a diagram of domain knowledge support.

Figure 13:
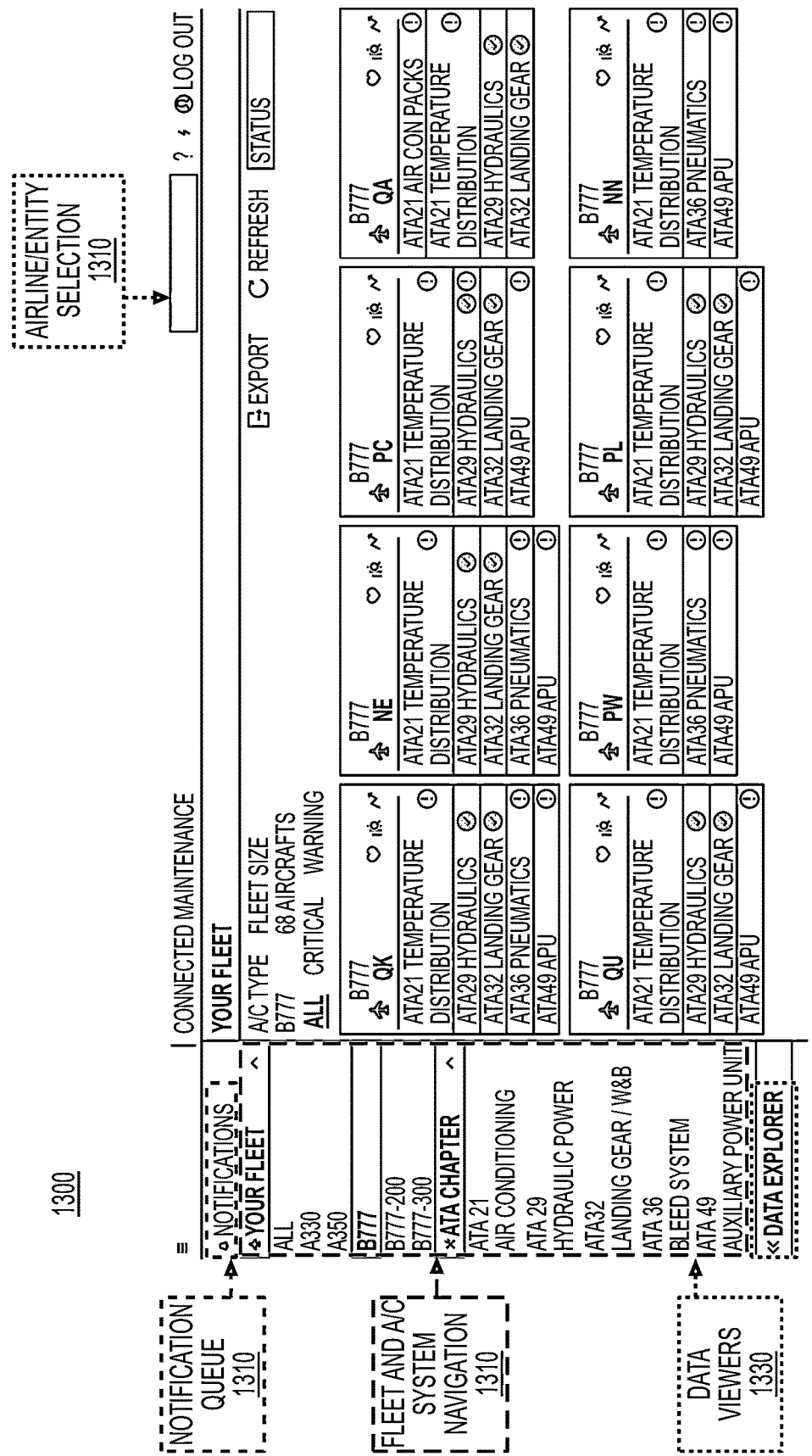
Figure 14:
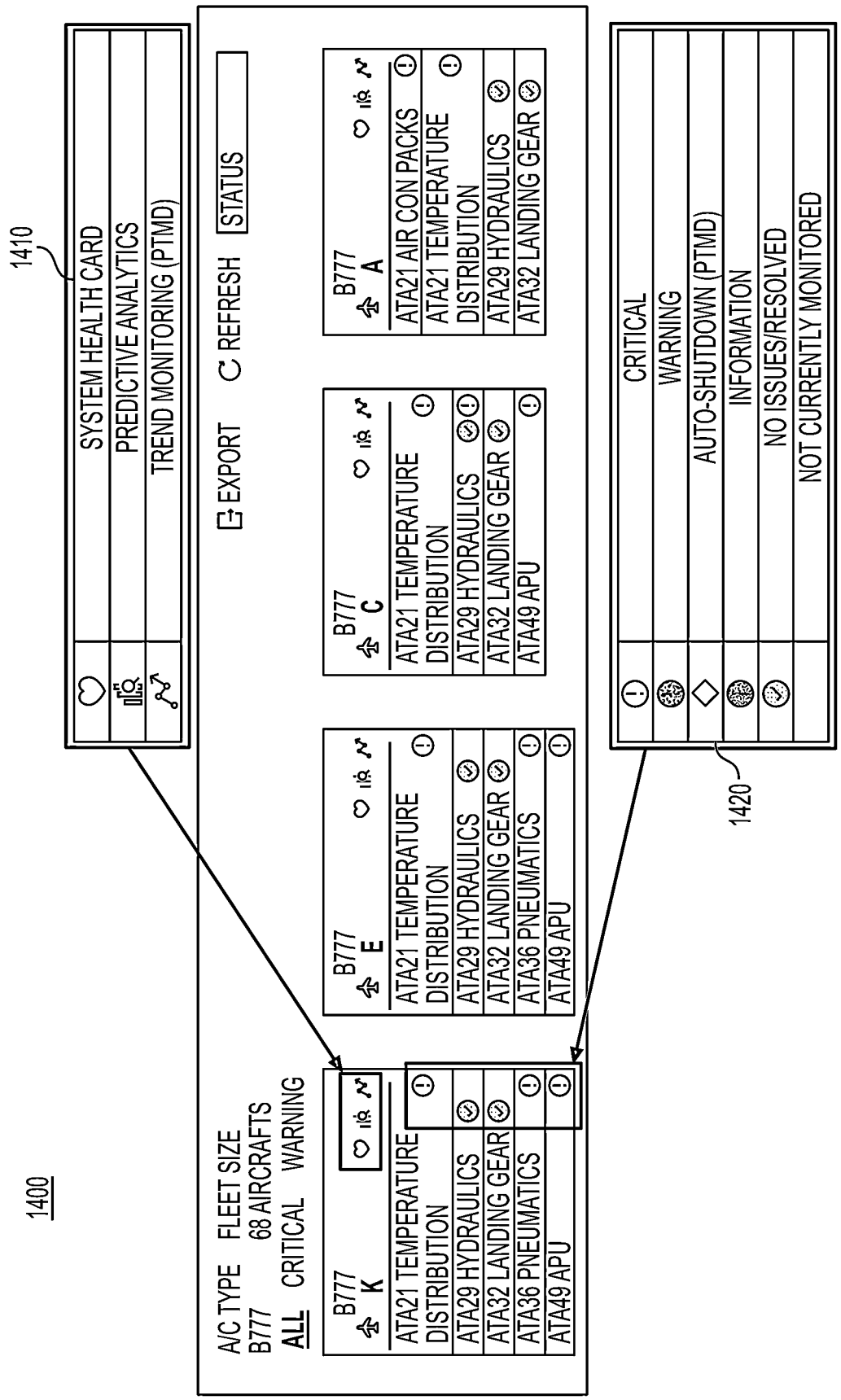

FIGS. 13 and 14 depict diagrams of an example user interface.

Figure 15:
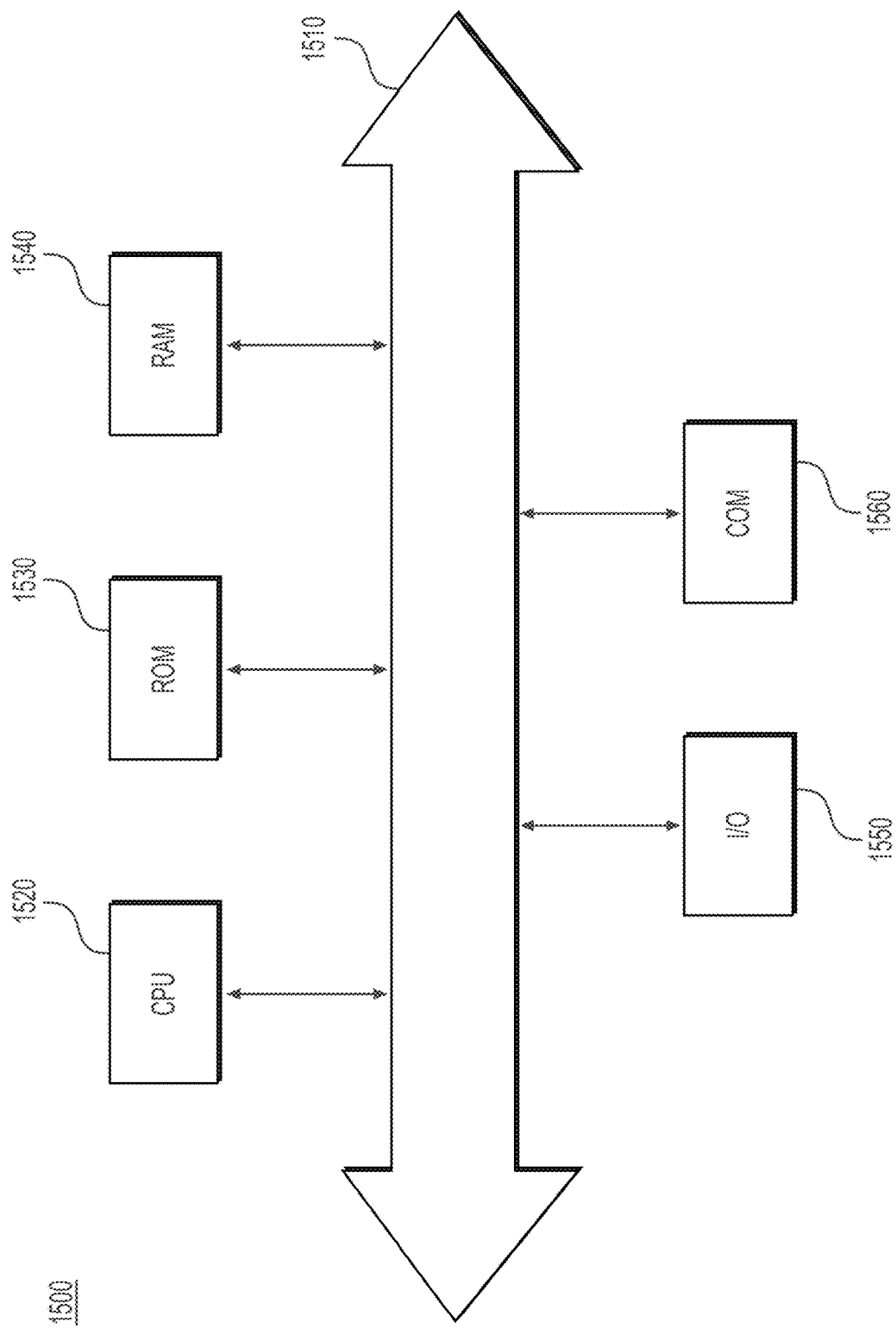

FIG. 15 depicts an example system that may execute techniques presented herein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, supercomputing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, Wi-Fi, NFC radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., Wi-Fi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure. With reference to FIG. 2, each edge gateway 162a-162n includes edge services 165a-165n and edge connectors 166a-166n. The edge services 165a-165n may include hardware and software components for processing the data from the edge devices 161*a*-161*n*. The edge connectors 166*a*-166*n* may include hardware and software components for facilitating communication between the edge gateway 162*a*-162*n* and the cloud 105 via network 110, as detailed above. In some cases, any of edge devices 161*a*-*n*, edge connectors 166*a*-*n*, and edge gateways 162*a*-*n* may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160*a*-160*n*. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160*a*-160*n* using an extensible object model (or "asset model") and knowledge graphs 251 where the equipment (e.g., edge devices 161*a*-161*n*) and processes of the enterprise 160*a*-160*n* are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161*a*-161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a*-161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a*-161*n* of an enterprise 160*a*-160*n*, and the knowledge graphs 251 are input into the EOM 250 for visualizing the models (e.g., the nodes and links).

The models describe the assets (e.g., the nodes) of an enterprise (e.g., the edge devices 161*a*-161*n*) and describe the relationship of the assets with other components (e.g., the links). The models also describe the schema (e.g., describe what the data is), and therefore the models are self-validating. For example, the model can describe the type of sensors mounted on any given asset (e.g., edge device 161*a*-161*n*) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 can understand and use the data from the new devices 161*a*-161*n*.

In some cases, asset templates are used to facilitate configuration of instances of edge devices 161*a*-161*n* in the model using common structures. An asset template defines the typical properties for the edge devices 161*a*-161*n* of a given enterprise 160*a*-160*n* for a certain type of device. For example, an asset template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161*a*-161*n* and determine what the naming conventions refer to. For example, the knowledge graph 250 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 250 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, data can be ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. Data may be sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third party applications 211 rather than, or in combination with, receiving the data from the edge devices 161*a*-161*n* directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161*a*-161*n*). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161*a*-161*n*) instance is created, any associated calculation instances are also created with their input and output parameters linked to the appropriate attributes of the asset (e.g., edge device 161*a*-161*n*).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160*a*-160*n* performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160*a*-160*n* looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

FIG. 3 depicts an example overview of a system for performing predictive maintenance using onboard analytics. As shown in FIG. 3, a system 300 may include an onboard device 310 of a vehicle (e.g., an aircraft), a remote server 320, a network 330, and a user device 340. The onboard device 310 may correspond to the edge 115 of FIG. 1, the remote server 320 may correspond to the cloud 105 of FIG. 1, and the network 330 may correspond to the network 110 of FIG. 1. Alternatively, the foregoing devices may correspond to different, or multiple, devices of FIG. 1.

As shown in FIG. 3, the onboard device 310 of the vehicle may receive component data related to a component of the vehicle during an operation of the vehicle. For example, the component data may be a flow control valve close time of a flow control valve of an aircraft. In this case, the flow control valve close time may be 40 ms.

The onboard device 310 may determine that the component data (e.g., flow control valve close time=40 ms) satisfies a first threshold (e.g., 30 ms) during the operation of the vehicle. The onboard device 310 may generate a condition indicator that indicates that the component data satisfies the first threshold, and transmit the condition indicator to the remote server 320 via the network 330 during the operation of the vehicle.

The remote server 320 may receive the condition indicator from the onboard device 310 via the network 330, and determine whether a number of condition indicators (e.g., 5), including the condition indicator, received from the onboard device 310 of the vehicle satisfies a second threshold (e.g., 4). For instance, the received condition indicator shown in FIG. 3 may be the fifth condition indicator received from the onboard device 310 in a particular time frame. In other words, the remote server 320 might have already received four other condition indicators from the onboard device 310 before receiving the condition indicator shown in FIG. 3.

Based on determining that the number of received condition indicators (e.g., 5) satisfies the second threshold (e.g., 4), the onboard device 310 may generate an alert, and transmit the alert to a user device 340. In this case, the user device 340 may display the alert (e.g., "Warning: flow control valve needs replacement") to permit an operator to ascertain a potential issue with the flow control valve.

FIG. 4 depicts a flowchart of an example process 400 for performing predictive maintenance using onboard analytics.

As shown in FIG. 4, the process 400 may include receiving, by an onboard device of a vehicle, component data related to a component of the vehicle during an operation of the vehicle (operation 410).

Although example embodiments herein describe the vehicle as being a particular type of aircraft (e.g., an airplane), it should be understood that the vehicle may be another type of aircraft (e.g., a helicopter, a shuttle, a drone, etc.), or another type of vehicle, such as an automobile, a ship, a train, a robot, etc. Moreover, the example embodiments are applicable to components that are not associated with vehicles, such as components of a factory, a home, a business, an office, an airport, etc.

The component of the vehicle may be a component of any of the systems of the vehicle. For example, the component may be a component of a flight control system, a landing gear system, a hydraulic system, an electrical system, an engine bleed air system, an avionics system, an environmental control system, a fuel system, a propulsion system, an ice protection system, a communication system, a navigation system, a monitoring system, a collision-avoidance system, a radar system, an aircraft condition monitoring system, etc. As particular examples, the component may be a valve, a pump, a reservoir, an oil cooler, an actuator, a generator, an alternator, a circuit, a turbine, a transmitter, a receiver, etc.

The component data may be any type of data related to the component. For example, the component data may be a close time for a flow control valve, a temperature of an engine, an amount of current in an actuator, a pressure of a fuel pump, a bleed flow rate, a duct pressure, a precooler inlet temperature, a valve position, upstream pressure of a valve, downstream pressure of a valve, HPSOV position, engine speed, bleed pressure regulating valve position, precooler inlet temperature, etc.

The onboard device 310 may receive the component data from a sensor of the vehicle, directly from the component, from another component, from another device, or the like. For example, the onboard device 310 may receive the component data from a vibration sensor, a temperature sensor, a pressure sensor, an electrical sensor, a speed sensor, a fuel sensor, a climate sensor, or the like. In some cases, the onboard device 310 may receive the component data via an aircraft network, or bus, using any suitable communication protocol, such as Aircraft Data Network (ADN), Aeronautical Radio, Incorporated (ARINC), ARINC 429, ARINC 629, ARINC 717, Commercial Standard Digital Bus, etc.

The onboard device 310 may receive the component data substantially in real-time during operation of the vehicle. Herein, receiving the component data "substantially in real-time" may refer to receiving the component data within a particular timeframe (e.g., 1 millisecond, 10 milliseconds, 1 second, 1 minute, etc.) of the component data being generated, monitored, measured, sensed, etc.

Herein, "during operation of the vehicle" may refer to a timeframe in which the vehicle is operating. For example, the timeframe may correspond to any portion of a flight of the vehicle in the case that the vehicle is an aircraft.

The onboard device 310 may receive the component data according to a particular time frame. For example, the onboard device 310 may receive the component data with a sampling frequency of every millisecond, every second, every minute, every time a relevant sensor generates the component data, etc.

The onboard device 310 may receive component data associated with multiple components. For example, the onboard device 310 may receive component data associated with tens, hundreds, etc., of components of the vehicle.

As further shown in FIG. 4, the process 400 may include determining, by the onboard device of the vehicle, that the component data satisfies a first threshold during the operation of the vehicle (operation 420).

The onboard device 310 may compare the received component data to a first threshold, and determine that the component satisfies the first threshold during operation of the vehicle.

The first threshold may be a threshold that corresponds to the underlying component data that is being analyzed. For example, if the component data is a close time of a flow control valve, then the first threshold is a close time. As another example, if the component data is a temperature of an engine, then the first threshold is a temperature.

The first threshold may be determined based on a phase of operation of the vehicle. For example, a flight of an aircraft may be associated with multiple phases (e.g., take-off, climb, cruise, descent, and landing). The onboard device 310 may determine the particular phase of operation of the vehicle that corresponds to the component data, and select the first threshold that corresponds to the determined particular phase of operation. For instance, the components of the vehicle may operate differently and may be associated with different values based on the phase of operation of the vehicle. As an example, an engine speed of the vehicle is different in the take-off phase than as compared to the climb phase.

The first threshold may be predetermined based on experimental data, based on historical data associated with operation of the vehicle or other similar vehicles, based on a machine learning model, or the like.

The first threshold may be a threshold that, when satisfied, is indicative of a potential failure of the component, is indicative of a need for maintenance of the component, is indicative of an anomaly associated with the component, is indicative of a need for replacement of the component, is indicative of non-compliance with a standard, is indicative of a non-efficient component, or the like.

The onboard device 310 may determine that the component data satisfies the first threshold based on the component data being greater than the first threshold, greater than or equal to the first threshold, less than the first threshold, or less than or equal to the first threshold.

The onboard device 310 may determine that any particular data point of the component data satisfies the first threshold. For example, the onboard device 310 may receive one hundred data points for a particular time frame, and may determine that any one particular data point satisfies the first threshold. Alternatively, the onboard device 310 may determine a representative value, such as an average value of the data points, a maximum value, a minimum value, a mean value, etc., of the data points, and determine that the representative value satisfies the first threshold.

As further shown in FIG. 4, the process 400 may include generating, by the onboard device of the vehicle, a condition indicator that indicates that the component data satisfies the first threshold, based on determining that the component data satisfies the first threshold during the operation of the vehicle (operation 430).

The condition indicator may be information that indicates that the component data satisfies the first threshold. The condition indicator may include a timestamp indicating a time at which the component data satisfied the first threshold, a time at which the condition indicator was generated, or the like. Additionally, or alternatively, the condition indicator may include a component identifier of the component, a vehicle identifier of the vehicle, a system identifier of a system to which the component belongs, or the like. Additionally, or alternatively, the condition indicator may include a value associated with the component data.

The condition indicator may be less information than as compared to the component data. For example, the condition indicator may include less bytes than as compared to the component data. As an example, the onboard device 310 may receive and store gigabytes, terabytes, etc., of component data during operation of the vehicle. In contrast, the condition indicator may be in the range of kilobytes or megabytes.

The onboard device 310 may generate the condition indicator based on determining that the component data satisfies the first threshold. Moreover, the onboard device 310 may generate the condition indicator based on determining that the component data satisfies the first threshold a predetermined number of times (e.g., once, twice, ten times, etc.). Additionally, the onboard device 310 may generate the condition indicator based on determining that the component data satisfies the first threshold a predetermined number of times in a predetermined time frame (e.g., one minute, ten minutes, one hour, etc.).

The onboard device 310 may generate the condition indicator based on a predetermined number of components being associated with respective component data that respectively satisfy first thresholds. For example, a condition indicator may indicate that a set of four different components are associated with component data that respectively satisfy first thresholds. A model may be trained (e.g., using PCA) to show the interactions of parameters and component data and how the parameters contribute to the overall variance of a dataset. When a component is in an abnormal state, then the results of the PCA model may show that the results diverge from expected, or normal, values. The first thresholds may be optimized to determine when triggers should occur to generate an alert.

As further shown in FIG. 4, the process 400 may include transmitting, by the onboard device of the vehicle, the condition indicator to a remote server via a network during the operation of the vehicle (operation 440).

The onboard device 310 may transmit the condition indicator to the remote server 320 via the network 330 during operation of the vehicle. The onboard device 310 may transmit the condition based on generating the condition indicator. The onboard device 310 may generate a packet, or a set of packets, including the condition indicator, and transmit the packet or the set of packets to the remote server 320 via the network.

As further shown in FIG. 4, the process 400 may include receiving the condition indicator from the onboard device (operation 450), and determining whether a number of condition indicators, including the condition indicator, received from the onboard device of the vehicle satisfies a second threshold (operation 460).

The remote server 320 may receive the condition indicator from the onboard device 310 via the network 330. Based on receiving the condition indicator, the remote server 320 may determine whether a number of condition indicators, including the condition indicator, received from the onboard device 310 satisfies a second threshold.

The second threshold may be a threshold that corresponds to a number of condition indicators received from the onboard device 310 that correspond to the same underlying component. For example, the second threshold may be one, two, five, ten, twenty, etc.

The second threshold may be predetermined based on experimental data, based on historical data associated with operation of the vehicle or other similar vehicles, based on a machine learning model, or the like.

The second threshold may be a threshold that, when satisfied, is indicative of a potential failure of the component, is indicative of a need for maintenance of the component, is indicative of an anomaly associated with the component, is indicative of a need for replacement of the component, is indicative of non-compliance with a standard, is indicative of a non-efficient component, or the like.

The remote server 320 may determine that the received number of condition indicators received from the onboard device 310 satisfies the second threshold based on the received number of condition indicators being greater than the second threshold, or greater than or equal to the second threshold.

As further shown in FIG. 4, the process 400 may include selectively generating an alert associated with the component of the vehicle based on determining whether the number of condition indicators received from the onboard device of the vehicle satisfies the second threshold (operation 470).

The remote server 320 may selectively generate an alert based on determining whether the number of received condition indicators satisfies the second threshold. For example, the remote server 320 may generate the alert based on determining that the number of received condition indicators is greater than or equal to the second threshold. Alternatively, as an example, the remote server 320 may generate the alert based on determining that the number of received condition indicators is less than the second threshold.

The remote server 320 may generate the alert, and transmit the alert to the user device 340 to permit an operator of the user device 340 to identify the potential issue associated with the component.

The user device 340 may display a UI that displays information associated with the vehicle, information associated with the components of the vehicle, information associated with the condition indicators, information received from the remove server 320, alerts received from the remote server 320, etc. For example, the user device 340 may display a UI as shown in FIGS. 13 and 14. The UI may include information associated with a fleet of vehicles. In this way, an operator of the user device 340 may interact with the UI to ascertain information associated with vehicles of the fleet.

As alternatives, the remote server 320 may perform a different type of action based on determining that the number of received condition indicators satisfies the second threshold. For example, the remote server 320 may transmit a message to the vehicle, may transmit a message to another device, may transmit an instruction to the vehicle that causes the vehicle to disable the system associated with the component, may transmit an instruction to the vehicle that causes the vehicle to adjust course, may order another component, may adjust a setting of another component of the vehicle, etc.

FIG. 5 depicts a diagram of an example data scope for analytics 500, according to one or more embodiments. As shown in FIG. 5, a remote server (e.g., the remove server 320) may receive data 510 from a vehicle via satellite communication, receive data 520 from a VHF/HF radio network, receive data 530 via Wi-Fi network, and receive data 540 via another network. The data 510 and/or the data 520 may include stored data such as fault code data, quick access recorder (QAR) data, parts identity data, third party data, controls data, platform data, and all other data associated with the vehicle. The data 530 may include line maintenance technical log data such as troubleshooting data, maintenance data, parts supply data, parts identity data, mission profile data, dispatch plan data, etc. The data 540 may include flight data, fault data, line maintenance data, troubleshooting data, maintenance data, sustainment data, reliability data, parts supply data, parts identity data, cost data, etc. The remote server may receive the foregoing data 510, 520, 530, and/or 540 via the respective channels, and/or may access airline enterprise operational data (e.g., platform data, maintenance data, parts identity data, etc.), business data (e.g., cost data, resource data, inventory data, etc.), enterprise engineering data (e.g., design data and testing data), manufacturing data (e.g., process data, testing data, bill of materials (BOM), etc.), and/or the like.

FIG. 6 depicts a diagram of analytics transfer to smart decisions 600, according to one or more embodiments. As shown in FIG. 6, a model (implemented by the remote server 320) may receive input data 610 (e.g., design data, testing data, manufacturing data, operation data, maintenance data, reliability data, environment data, etc.) associated with a vehicle, apply one or more integrated reasoning techniques 620 (e.g., physics-based modeling, analytics/machine learning, Heuristics modeling, statistics/reliability modeling, data-driven methods, hybrid techniques, etc.), and output smart decisions 630 such as operation optimization, maintenance optimization, asset optimization, business optimization, etc.

The physics-based modeling may include models derived from "first principles," may include models derived from usage based on material properties, and/or may include fault models (failure mode and symptom mapping). The data-driven methods may include methods based on system events and time series data, regression techniques (e.g., least-square, SVM, etc.), mapping/clustering (e.g., NN, SOM, PCA, etc.), deep learning (e.g., CNN, etc.), statistics (e.g., Bayesian, association rules, etc.), or the like. The hybrid techniques may include a combination of modeling and data-driven statistics (e.g., particle filter). The model may start with available data, such as health status checking, data-driven analytics, physics-based performance trending, etc., and utilize physics and domain knowledge in data definition and analytics results validation. The model may provide new edge solutions for additional LRU coverage and enhanced analytics. Moreover, the model may provide developed physics-based modeling in enhancing both the analytics and the service offerings.

FIG. 7 depicts a diagram of analytics for connected maintenance in a connected system framework 700. As shown in FIG. 7, a remote server may receive data 710, such as PFIS data, QAR data, ACMS/ACARS data, airline M&E system data, disruption track tool data, ACMS data, HON shop data, Non HON shop data, fleet information, etc., in the form of actual flight data, QAR data, reports data, tech logs data, disruption data, fault messages (class 1 and 2) data, R/O data, fleet data, respectively. Moreover, the remote server may receive new LRU data from new edge solutions (e.g., W&B, 737NG ECS, etc.), streaming data from improved edge solutions (e.g., controls, ADG400), etc., new modeling data such as physics-based modeling (e.g. DT), etc.

The remote server may include architecture 720 such as a user interface, APIs, microservices, data processing, a data lake/data warehouse, etc. The remote server may implement algorithm development and continuous improvement 730 by receiving alert screening from an aircraft domain subject matter expert.

FIG. 8 depicts a diagram of an analytics-centered data view in a connected maintenance framework 800. As shown in FIG. 8, an analytics platform (e.g., the remote server 320) may receive data 810, such as ARINC or SITA data, disruption data, maintenance data, AR data, etc., at various time intervals (e.g., near real-time, monthly, daily, each flight, etc.), and provide connected maintenance service 820 to the airline, and/or provide remote live access 830 to a maintenance system.

FIG. 9 depicts a diagram of analytics models 900. The models may be trained to generate an alert when the data indicates that a part is close to failure. Further, the models may be generated to give a prediction for the known fault cases using the identified features. As an example, FIG. 9 shows HPSOV case analytic models that identify when the data for two engines diverge.

FIG. 10 depicts a diagram of clustering for rule-based prediction 1000. FIG. 10 depicts a high fidelity algorithm with differentiated failure patterns for a pressure valve, as an example. The model may be generated using key QAR parameters, such as engine speed (raw value), valve position (raw value), pressure (minimum value, average value, and maximum value), and flight phase (phase 1, phase 2, and phase 3).

FIG. 11 depicts a diagram for deep learning with neural a network for prediction 1100. FIG. 11 depicts advanced AI techniques implemented using recurrent neural networks (RNNs) and neural networks (NNs). The models shown in FIG. 11 may use key QAR parameters such as downstream pressure, upstream pressure, and cabin pressure, as an example.

FIG. 12 depicts a diagram of domain knowledge support 1200. For instance, the remote server can generate recommendations such as "replace the APU ignition exciter as per relevant AMM procedure," "replace the APU igniter plugs (2 off) as per relevant AMM procedure," "replace or swap the APU controller (ECB), if the fault continues, then; Perform wiring checks between APU Controller (ECB) and the APU on the airframe side," "Perform wiring checks between the APU Controller (ECB) and the APU on the airframe side," "Replace or swap the APU Controller (ECB), if fault continues," and "Perform wiring checks between APU Controller (ECB) and the APU on the airframe side, based on analytics using faults from event history, AME integrated latest events, and continuous issue tracking."

FIGS. 13 and 14 depict a UI 1300 for displaying information associated with the vehicle, information associated with the components of the vehicle, information associated with the condition indicators, etc. For example, the user device 340 may display the UI 1300 as shown in FIGS. 13 and 14. The UI may include information associated with a fleet of vehicles. In this way, an operator of the user device 340 may interact with the UI to ascertain information associated with vehicles of the fleet.

As shown in FIG. 13, the UI 1300 may include a notification queue 1310 that displays notifications (or alerts) received form the remote server 320. The UI 1300 may display a fleet and A/C system navigation 1320 that displays a list of vehicles associated with a fleet. The UI 1300 may display data viewers 1330 that display data associated with components of a vehicle. The UI 1300 may display an airline/entity selection 1340 that permits the operator to enter an input airline or entity in order to search for vehicles associated with the airline or entity.

As shown in FIG. 14, the UI 1300 may include a menu 1410 that displays icons associated with a system health card, predictive analytics, and trend monitoring (PTMD). Further, as shown, the UI 1300 may display various icons 1420 in association with various components of vehicles. For instance, the icons 1420 may designate various states of the components, such as "critical," "warning," "auto-shutdown (PTMD)," "no issues/resolved," etc. In this way, an operator may view the respective icons 1420 corresponding to the various components of the vehicle to gauge what maintenance or intervention, if any, should be taken in association with a particular vehicle.

FIG. 15 depicts an example system 1500 that may execute techniques presented herein. FIG. 15 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1560 for packet data communication. The platform also may include a central processing unit ("CPU") 1520, in the form of one or more processors, for executing program instructions. The platform may include an internal communication bus 1510, and the platform also may include a program storage and/or a data storage for various data files to be processed and/or communicated by the platform such as ROM 1530 and RAM 1540, although the system 1500 may receive programming and data via network communications. The system 1500 also may include input and output ports 1550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A method comprising:
   receiving, by an onboard device of a vehicle, component data related to a component of the vehicle during an operation of the vehicle;
   identifying, by the onboard device of the vehicle, functioning of the component during the operation of the vehicle;
   selecting, by the onboard device of the vehicle, a first threshold based on the functioning of the component during the operation of the vehicle;
   determining, by the onboard device of the vehicle, that the component data satisfies the first threshold during the operation of the vehicle;
   generating, by the onboard device of the vehicle, a condition indicator that indicates that the component data satisfies the first threshold, based on determining that the component data satisfies the first threshold during the operation of the vehicle; and
   transmitting, by the onboard device of the vehicle, the condition indicator to a remote server via a network during the operation of the vehicle,
   wherein the remote server is configured to determine whether a number of condition indicators, including the condition indicator, received from the onboard device of the vehicle satisfies a second threshold, and selectively generate an alert associated with the component of the vehicle based on determining whether the number of condition indicators received from the onboard device of the vehicle satisfies the second threshold, and
   wherein the remote server is further configured to perform one or more actions based on determining that the number of received condition indicators satisfies the second threshold, wherein the one or more actions comprise at least one of: disabling a system associated with the component, providing instruction to another component of the vehicle, or adjusting settings of another component of the vehicle.

2. The method of claim 1, further comprising:
   determining that the component data satisfies the first threshold a predetermined number of times,
   wherein the generating the condition indicator includes generating the condition indicator, based on determining that the component data satisfies the first threshold the predetermined number of times.

3. The method of claim 1, further comprising:
   determining that the component data satisfies the first threshold a predetermined number of times in a predetermined time frame,
   wherein the generating the condition indicator includes generating the condition indicator, based on determining that the component data satisfies the first threshold the predetermined number of times in the predetermined time frame.

4. The method of claim 1, further comprising:
   determining that a predetermined number of components are associated with respective component data that satisfy respective first thresholds,
   wherein the generating the condition indicator includes generating the condition indicator, based on determining that the predetermined number of components are associated with the respective component data that satisfy the respective first thresholds.

5. The method of claim 1, further comprising:
   generating a timestamp associated with the component data,
   wherein the transmitting comprises transmitting the timestamp along with the condition indicator.

6. The method of claim 1, wherein the first threshold or the second threshold is indicative of a potential failure of the component, is indicative of a need for maintenance of the component, is indicative of an anomaly associated with the component, is indicative of a need for replacement of the component, is indicative of non-compliance with a standard, or is indicative of a non-efficient component.

7. The method of claim 1, further comprising:
   determining a phase of the operation of the vehicle based on the component data; and
   determining the first threshold, based on the phase of the operation of the vehicle.

8. An onboard device of a vehicle, the onboard device comprising:
   a memory configured to store instructions; and
   a processor configured to execute the instructions to perform a method comprising:
     receiving component data related to a component of the vehicle during an operation of the vehicle;
     identifying functioning of the component during the operation of the vehicle;
     selecting a first threshold based on the functioning of the component during the operation of the vehicle;
     determining that the component data satisfies the first threshold during the operation of the vehicle;
     generating a condition indicator that indicates that the component data satisfies the first threshold, based on determining that the component data satisfies the first threshold during the operation of the vehicle; and
     transmitting the condition indicator to a remote server via a network during the operation of the vehicle,
     wherein the remote server is configured to determine whether a number of condition indicators, including the condition indicator, received from the onboard device of the vehicle satisfies a second threshold, and selectively generate an alert associated with the component of the vehicle based on determining whether the number of condition indicators received, and
     wherein the remote server is further configured to perform one or more actions based on determining that the number of received condition indicators satisfies the second threshold, wherein the one or more actions comprise at least one of: disabling a system associated with the component, providing instruction to another component of the vehicle, or adjusting settings of another component of the vehicle.

9. The onboard device of claim 8, wherein the method further comprises:
   determining that the component data satisfies the first threshold a predetermined number of times,
   wherein the generating the condition indicator includes generating the condition indicator, based on determining that the component data satisfies the first threshold the predetermined number of times.

10. The onboard device of claim 8, wherein the method further comprises:
  determining that the component data satisfies the first threshold a predetermined number of times in a predetermined time frame,
  wherein the generating the condition indicator includes generating the condition indicator, based on determining that the component data satisfies the first threshold the predetermined number of times in the predetermined time frame.

11. The onboard device of claim 8, wherein the method further comprises:
  determining that a predetermined number of components are associated with respective component data that satisfy respective first thresholds,
  wherein the generating the condition indicator includes generating the condition indicator, based on determining that the predetermined number of components are associated with the respective component data that satisfy the respective first thresholds.

12. The onboard device of claim 8, wherein the method further comprises:
  generating a timestamp associated with the component data,
  wherein the transmitting comprises transmitting the timestamp along with the condition indicator.

13. The onboard device of claim 8, wherein the first threshold or the second threshold is indicative of a potential failure of the component, is indicative of a need for maintenance of the component, is indicative of an anomaly associated with the component, is indicative of a need for replacement of the component, is indicative of non-compliance with a standard, or is indicative of a non-efficient component.

14. The onboard device of claim 8, wherein the method further comprises:
  determining a phase of the operation of the vehicle based on the component data; and
  determining the first threshold, based on the phase of the operation of the vehicle.

15. A non-transitory computer-readable medium configured to store instructions that, when executed by a processor of an onboard device of a vehicle, cause the processor to perform a method comprising:
  receiving component data related to a component of the vehicle during an operation of the vehicle;
  identifying functioning of the component during the operation of the vehicle;
  selecting a first threshold based on the functioning of the component during the operation of the vehicle;
  determining that the component data satisfies the first threshold during the operation of the vehicle;
  generating a condition indicator that indicates that the component data satisfies the first threshold, based on determining that the component data satisfies the first threshold during the operation of the vehicle; and
  transmitting the condition indicator to a remote server via a network during the operation of the vehicle,
  wherein the remote server is configured to determine whether a number of condition indicators, including the condition indicator, received from the onboard device of the vehicle satisfies a second threshold, and selectively generate an alert associated with the component of the vehicle based on determining whether the number of condition indicators received, and
  wherein the remote server is further configured to perform one or more actions based on determining that the number of received condition indicators satisfies the second threshold, wherein the one or more actions comprise at least one of: disabling a system associated with the component, providing instruction to another component of the vehicle, or adjusting settings of another component of the vehicle.

16. The non-transitory computer-readable medium of claim 15, wherein the method further comprises:
  determining that the component data satisfies the first threshold a predetermined number of times,
  wherein the generating the condition indicator includes generating the condition indicator, based on determining that the component data satisfies the first threshold the predetermined number of times.

17. The non-transitory computer-readable medium of claim 15, wherein the method further comprises:
  determining that the component data satisfies the first threshold a predetermined number of times in a predetermined time frame,
  wherein the generating the condition indicator includes generating the condition indicator, based on determining that the component data satisfies the first threshold the predetermined number of times in the predetermined time frame.

18. The non-transitory computer-readable medium of claim 15, wherein the method further comprises:
  determining that a predetermined number of components are associated with respective component data that satisfy respective first thresholds,
  wherein the generating the condition indicator includes generating the condition indicator, based on determining that the predetermined number of components are associated with the respective component data that satisfy the respective first thresholds.

19. The non-transitory computer-readable medium of claim 15, wherein the method further comprises:
  generating a timestamp associated with the component data,
  wherein the transmitting comprises transmitting the timestamp along with the condition indicator.

20. The non-transitory computer-readable medium of claim 15, wherein the first threshold or the second threshold is indicative of a potential failure of the component, is indicative of a need for maintenance of the component, is indicative of an anomaly associated with the component, is indicative of a need for replacement of the component, is indicative of non-compliance with a standard, or is indicative of a non-efficient component.

* * * * *